US005954363A

United States Patent [19]

Cymbal et al.

[11] Patent Number: 5,954,363

[45] Date of Patent: Sep. 21, 1999

[54] ENERGY-ABSORBING STEERING COLUMN FOR MOTOR VEHICLE

[75] Inventors: William David Cymbal, Freeland; Carl T. Seamon, Montrose; Jerry Wade, Saginaw, all of Mich.

[73] Assignee: General Motors Corporation, Detroit, Mich.

[21] Appl. No.: 08/993,670

[22] Filed: Dec. 18, 1997

[51] Int. Cl.[6] .................................................. B62D 1/19

[52] U.S. Cl. .................................................. 280/777; 74/492

[58] Field of Search .................................................. 280/777, 775; 74/492, 493

[56] References Cited

U.S. PATENT DOCUMENTS

| | | | |
|---|---|---|---|
| 3,792,626 | 2/1974 | Durkee et al. | 74/492 |
| 3,827,710 | 8/1974 | Connell et al. | 280/87 R |
| 5,692,778 | 12/1997 | Cymbal | 280/777 |
| 5,788,278 | 8/1998 | Thomas et al. | 280/777 |

*Primary Examiner*—Paul N. Dickson

*Attorney, Agent, or Firm*—Robert M. Sigler

[57] ABSTRACT

An energy-absorbing motor vehicle steering column including a structural housing, a pair of wedge blocks supported in guide channels on the structural housing for linear translation parallel to a longitudinal centerline of the steering column, a retainer plate on the structural housing over the guide channels, a lateral shoulder on each wedge block, and springs between each of the wedge blocks and the structural housing. When the wedge blocks are pushed backward in their guide channels, the springs are compressed and tip the wedge blocks upward to seat the lateral shoulders on the wedge blocks against the retainer plate and thereby retain the wedge blocks in retracted positions. The retainer plate is hooked over a lateral rod on a body of the motor vehicle to support an aft end of the structural housing vertically on the vehicle body. The lateral rod releases the wedge blocks from their retracted positions by tipping the wedge blocks downward in the guide channels whereupon the thrust of the springs wedges the ramps on the wedge blocks under the lateral rod to eliminate vertical lash and lash in the direction of the longitudinal centerline of the steering column.

3 Claims, 3 Drawing Sheets

ENERGY-ABSORBING STEERING COLUMN FOR MOTOR VEHICLE

TECHNICAL FIELD

This invention relates to energy-absorbing steering columns for motor vehicles.

BACKGROUND OF THE INVENTION

U.S. patent application Ser. No. 08/747,807, filed Nov. 14, 1996, now U.S. Pat. No. 5,692,778 and assigned to the assignee of this invention, describes an energy-absorbing motor vehicle steering column including a structural housing, a releasable mount or attachment between a body of the motor vehicle and a forward end of the structural housing, and a releasable mount or attachment between an aft end of the structural housing and the vehicle body which restrains the aft end vertically and in the direction of a longitudinal centerline of the steering column. The aft attachment includes a lateral rod on the body of the motor vehicle, a retainer plate on the structural housing which hooks over the lateral rod, a pair of wedge blocks on the structural housing slidable in the direction of the longitudinal centerline of the latter, a ramp on each of the wedge blocks facing the lateral rod, and a pair of springs biasing the wedge blocks toward the lateral rod. The springs wedge the ramps on the wedge blocks under the lateral rod to eliminate vertical lash and lash in the direction of the longitudinal centerline of the structural housing.

SUMMARY OF THE INVENTION

This invention is a new and improved energy-absorbing motor vehicle steering column including a structural housing, a pair of wedge blocks supported in guide channels on the structural housing for linear translation parallel to a longitudinal centerline of the steering column, a retainer plate on the structural housing over the guide channels, a lateral shoulder on each wedge block, and springs between each of the wedge blocks and the structural housing. When the wedge blocks are pushed backward in their guide channels, the springs are compressed and resultant vector force components of the thrust of the springs tip the wedge blocks upward and seat the lateral shoulders on the wedge blocks against the retainer plate to retain the wedge blocks in retracted positions with the springs compressed. With the wedge blocks thus retained in their retracted positions, the retainer plate is hooked over a lateral rod on a body of the motor vehicle to support an aft end of the structural housing vertically on the vehicle body. The lateral rod releases the wedge blocks from their retracted positions by tipping the wedge blocks downward, whereupon the thrust of the springs wedge ramps on the wedge blocks under the lateral rod to eliminate vertical lash and lash in the direction of the longitudinal centerline of the steering column between the structural housing and the lateral rod.

DESCRIPTION OF THE PREFERRED EMBODIMENT

Figure 1:
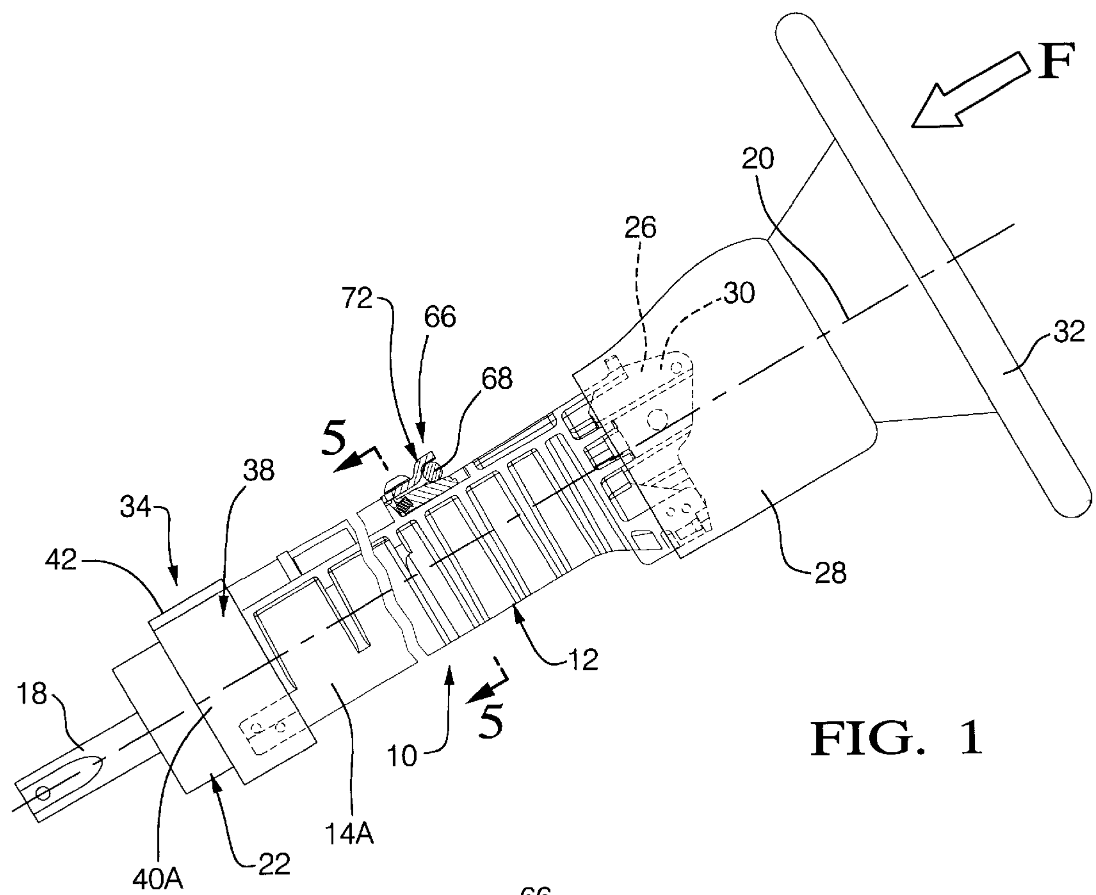
FIG. 1 is an elevational view of an energy-absorbing motor vehicle steering column according to this invention.
Figure 2:
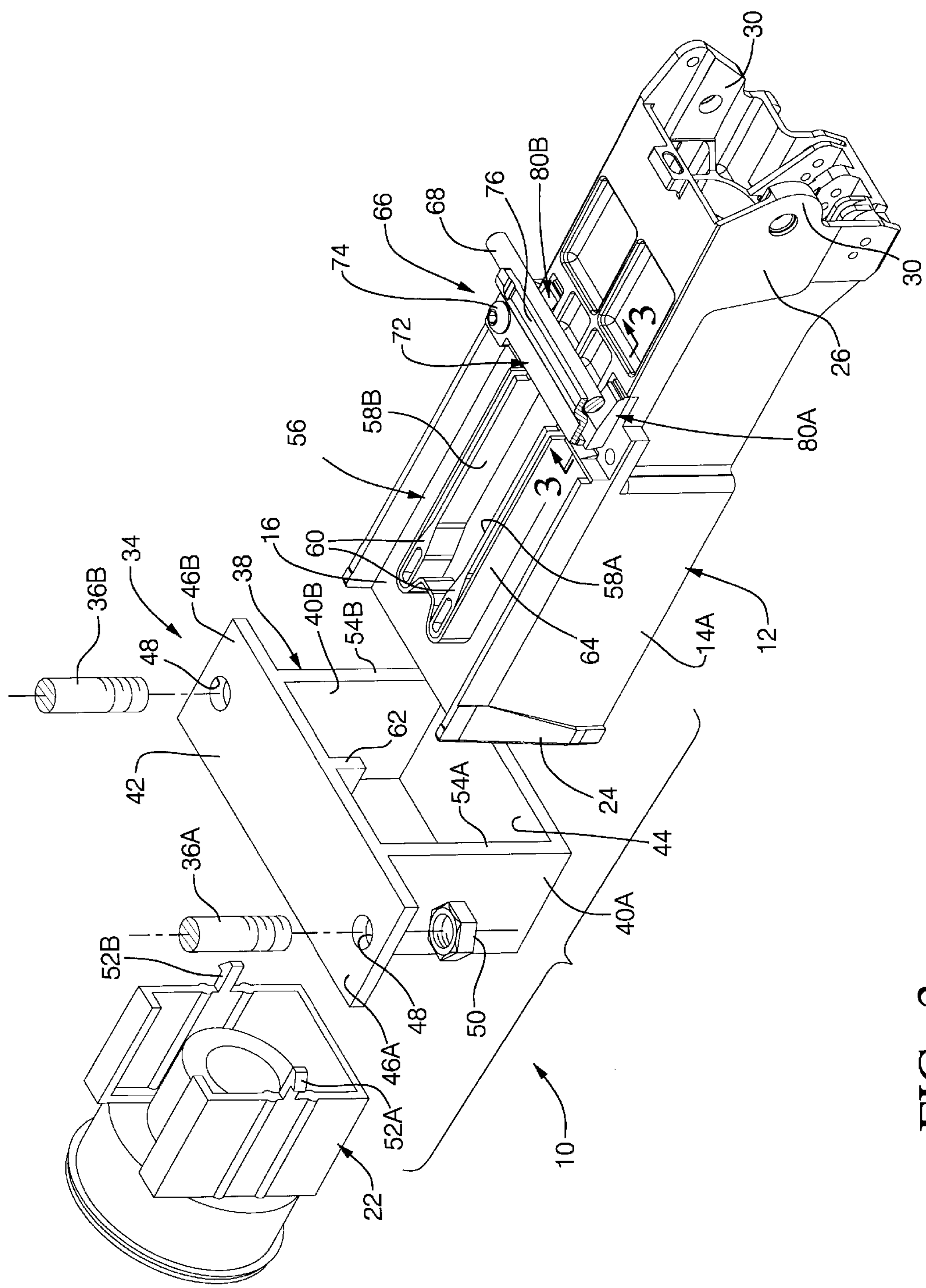
FIG. 2 is an exploded perspective view of the energy-absorbing motor vehicle steering column according to this invention.

Referring to FIGS. 1–2, an energy-absorbing motor vehicle steering column 10 according to this invention includes a structural housing 12 having a pair of vertical walls 14A, 14B and a horizontal wall 16. A steering shaft 18 of the steering column is supported on the structural housing 12 for rotation about a longitudinal centerline 20 of the steering column by a bearing, not shown, on a plastic bearing support 22 at a forward end 24 of the structural housing and by another bearing, not shown, at an enlarged and reinforced aft end 26 of the structural housing.

A tilt housing, not shown, of the steering column 10 is concealed behind a shroud 28 on the steering column and supported on a pair of lugs 30 at the aft end 26 of the structural housing 12 for up and down pivotal movement. A steering wheel 32 is rotatably supported on the tilt housing and connected to the steering shaft 18 for rotation therewith by universal coupling, not shown.

A releasable forward mount or attachment 34 between the forward end 24 for the structural housing 12 and a body, not shown, of the motor vehicle includes a pair of vertical hangers 36A, 36B on the body and a box-shaped bracket 38. The box-shaped bracket 38 has a pair of vertical sides 40A, 40B outboard of the plastic bearing support 22, an upper horizontal side 42 above the structural housing 12, a lower horizontal side 44 below the structural housing, and a pair of lateral flanges 46A, 46B in the plane of the upper horizontal side. Each lateral flange 46A, 46B has a perforation 48 therein to receive a corresponding one of the vertical hangers 36A, 36B and is clamped to the vehicle body by a fastener 50 on the corresponding vertical hanger below the perforation.

A pair of hooks 52A, 52B on the plastic bearing support 22 seat against respective ones of a pair of edges 54A, 54B of the vertical sides 40A, 40B of the bracket 38 to restrain the structural housing 12 relative to the bracket 38 in the direction of the longitudinal centerline 20 of the steering column. Perpendicular to the longitudinal centerline 20, the forward end 24 of the structural housing 12 is restrained vertically and laterally by the upper and lower horizontal sides 42, 44 of the bracket 38 and by the vertical sides 40A, 40B of the bracket.

An energy absorber 56 of the steering column 10 includes a pair of partition walls 58A, 58B integral with the structural housing 12 parallel to the vertical walls 14A, 14B each having an integral boss 60 at an end thereof. The energy absorber further includes an abutment 62 on the upper horizontal side 42 of the box-shaped bracket 38 parallel to and between the partition walls. A flat metal ribbon 64 of the energy absorber is seated edge-wise on the horizontal wall 16 of the structural housing 12 with a pair of straight sections between the partition walls 58A, 58B and the vertical walls 14A, 14B and with a lateral web looped over and extending laterally between the bosses 60 at the ends of the partition walls. A more detailed description of the energy absorber 56 appears in U.S. Ser. No. 08/544,237, which description is incorporated herein by reference.

An aft mount or attachment 66 between the vehicle body and the aft end 26 of the structural housing 12 includes a lateral rod 68 rigidly attached to the vehicle body and a pair of guide channels 70A, 70B in the structural housing parallel to and on opposite sides of the longitudinal centerline 20 of the steering column. A retainer plate 72 of the aft attachment 66 is rigidly attached to the structural housing 12 over the guide channels 70A, 70B by a pair of fasteners 74 and includes a lip 76 and an inboard edge 78.

Figure 3:
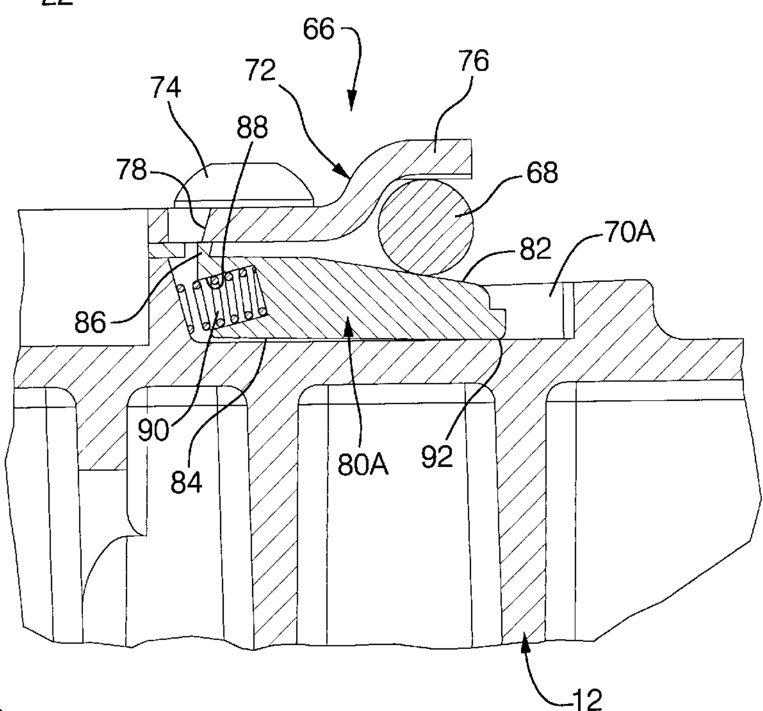
FIG. 3 is an enlarged sectional view taken generally along the plane indicated by lines 3—3 in FIG. 2.
Figure 4:
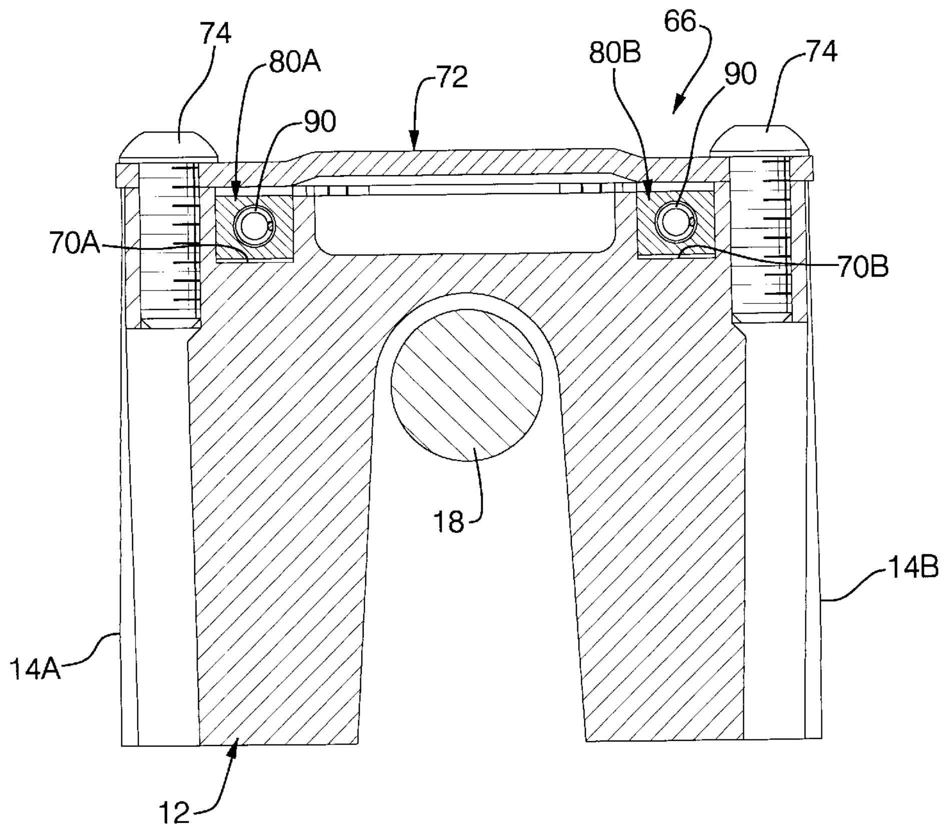
FIG. 4 is similar to FIG. 3 showing elements of the energy-absorbing motor vehicle steering column according to this invention in different relative positions.
Figure 5:
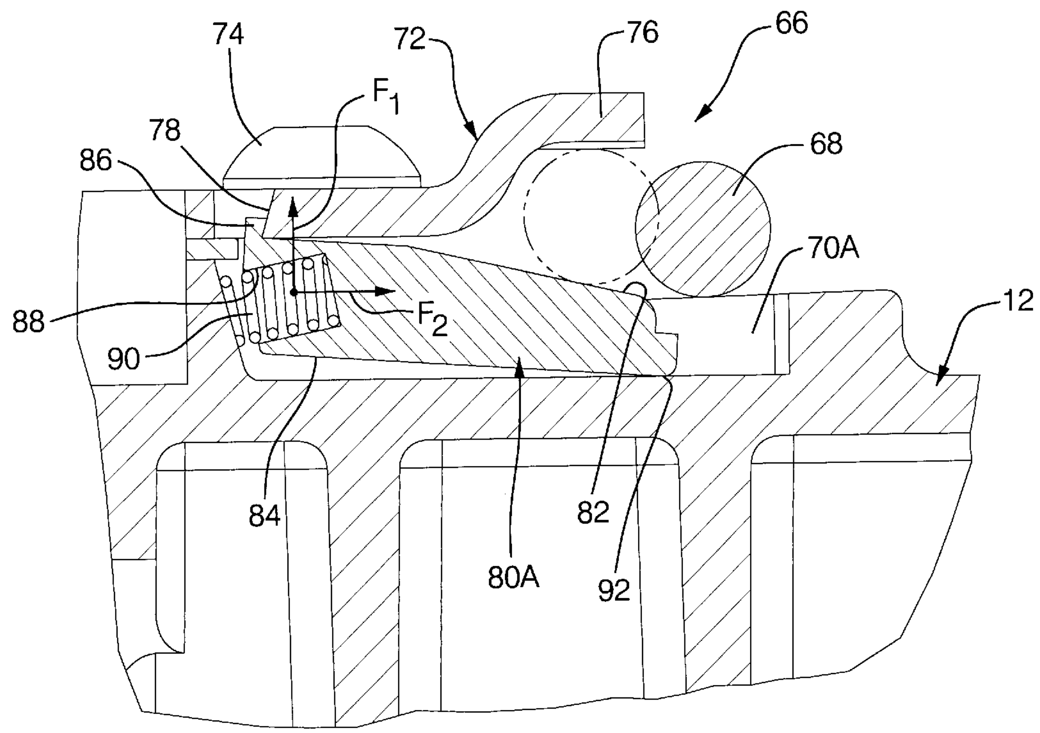
FIG. 5 is an enlarged sectional view taken generally along the plane indicated by lines 5—5 in FIG. 1.

As seen best in FIGS. 3 and 4, respective ones of a pair of wedge blocks 80A, 80B are slidably mounted in the guide channels 70A, 70B. Each wedge block 80A, 80B has an inclined ramp 82 facing the lateral rod 68 and a flat side 84 facing the bottom of the corresponding guide channel. Each wedge block further includes a lateral shoulder 86 at an end of the ramp 82 on the wedge block and a generally cylindrical socket 88 facing an inboard end of the corresponding guide channel 70A, 70B. Respective ones of a pair of springs 90 bear against the structural housing 12 at the inboard end of the corresponding guide channel and against the bottoms of the sockets 88 in the wedge blocks 80A, 80B. The inboard ends of the guide channels are parallel to the bottoms of the sockets and oblique to the guide channels so that the thrust of each spring on the corresponding wedge block includes a schematically represented resultant vector force component "$F_1$" perpendicular to the corresponding guide channel and a schematically represented resultant vector force component "$F_2$" parallel to the corresponding guide channel, FIG. 5.

In preparation for mounting the structural housing 12 on the vehicle body, each of the wedge blocks 80A, 80B is pushed backward in its guide channel 70A, 70B to a retracted position, FIG. 4, in which the wedge blocks are tipped upward by the springs 90 about an edge 92 of each wedge block at the end of the flat side 84 thereof and the lateral shoulders 86 on the wedge blocks are seated against the inboard edge 78 of the retainer plate. The resultant vector force components $F_1$, $F_2$ perpendicular and parallel to the guide channels 70A, 70B thrust the wedge blocks 80A, 80B against the inboard edge 78 of the retainer plate in directions calculated to retain the wedge blocks in their retracted positions with the springs compressed so that the springs, the lateral shoulders, and the inboard edge of the retainer plate constitute latches which automatically latch or retain the wedge blocks in their retracted positions when the wedge blocks are pushed backward in their guide channels.

With the wedge blocks 80A, 80B latched in their retracted positions, the structural housing 12 is mounted on the body of the motor vehicle by hooking the lip 76 of the retainer plate over the lateral rod 68 and pivoting the structural housing upward about the lateral rod. At the same time, the structural housing is pushed toward the lateral rod 68 to align the vertical hangers 36A, 36B with corresponding ones of the perforations 48 in the lateral flanges 46A, 46B of the box-shaped bracket 38. As the structural housing is pushed toward the lateral rod, the lateral rod seats tangentially against the ramps 82 on the wedge blocks 80A, 80B and tips the wedge blocks downward about the edges 92 thereof. At the onset of such downward tipping, the lateral shoulders 86 on the wedge blocks separate from the inboard edge 78 of the retainer plate 72 to release the wedge blocks from their retracted positions, FIG. 3.

With the wedge blocks released from their retracted positions, the resultant vector force components $F_2$ of the springs 90 parallel to the guide channels 70A, 70B thrust the wedge blocks outward in the guide channels and wedge the ramps 82 tangentially under the lateral rod 68. With the ramps wedged tangentially under the lateral rod, dimensional clearance between the structural housing 12 and the lateral rod 68 which would otherwise permit relative vertical movement therebetween, i.e., vertical lash, is eliminated. Similarly, with the ramps wedged tangentially under the lateral rod, dimensional clearance between the structural housing and the lateral rod which would otherwise permit relative movement therebetween parallel to the longitudinal centerline 20 of the steering column, i.e., lash in the direction of the longitudinal centerline 20, is also eliminated. The mounting of the structural housing 12 on the vehicle body is completed by installation of the fasteners 50 on the vertical hangers 36A, 36B below the perforations 48 in lateral flanges of the box-shaped bracket 38.

After the steering column 10 is thus mounted on the vehicle body, an impact on the steering wheel 32 represented schematically by a vector force "F" dislodges the hooks 52A, 52B from the edges 54A, 54B of the vertical sides of the box-shaped bracket 38 so that the bearing support 22 and the forward end 24 of the structural housing 12 are released from the bracket 38 and the vehicle body. Concurrently, the lateral rod 68 dislodges from between the lip 76 of the retainer plate 72 and the ramps 82 on the wedge blocks 80A, 80B to release the aft end 26 of the structural housing from the vehicle body. Thereafter, the structural housing 12 translates linearly in the direction of the longitudinal centerline 20 through a collapse stroke during which the abutment 62 on the box-shaped bracket anchors the center of the lateral web of the flat ribbon 64 while the straight sections of the latter are pulled over anvils defined by the bosses 60. As the straight sections are pulled over the bosses, each is folded back on itself almost 180° and plastically deformed to produce a controlled resistance to linear translation of the structural housing 12 for energy absorption.

The aforesaid latches constituted by the lateral shoulders 86 on the wedge blocks 80A, 80B, the springs 90, and the inboard edge 78 of the retainer plate 72 are important features of this invention because they reduce the manual effort required to install the structural housing 12 on the body of the motor vehicle. That is, because the wedge blocks are not released from their retracted positions until the perforations 48 in the lateral flanges 46A, 46B on the box-shaped bracket 38 are almost fully aligned with the vertical hangers 36A, 36B, the installer is not required to exert force on the structural housing to compress the springs 90 while pivoting the structural housing upward about the lateral rod as described above.

Having thus described the invention, what is claimed is:

1. An energy-absorbing motor vehicle steering column including a structural housing having a forward end and an aft end, a forward attachment means operative to normally restrain said forward end of said structural housing relative to a vehicle body in the direction of and perpendicular to a longitudinal centerline of said steering column and to release said forward end of said structural housing for linear translation in the direction of said longitudinal centerline in response to an impact on said structural housing, an energy absorber operative to convert into work a fraction of the kinetic energy of said impact on said structural housing during linear translation thereof, and an aft attachment means operative to normally restrain said aft end of said structural housing relative to said vehicle body and to release said aft end of said structural housing for linear translation in the direction of said longitudinal centerline of said steering column in response to said impact on said structural housing, characterized in that said aft attachment means comprises:

a lateral rod rigidly supported on said vehicle body vertically above said structural housing, a guide channel in said structural housing having an inboard end, a retainer plate on said structural housing over said guide channel having a lip hooked over said lateral rod such that said aft end of said structural housing is vertically suspended from said lateral rod, a wedge block mounted in said guide channel for linear translation, a ramp on said wedge block facing said lateral rod, a spring operative to thrust said wedge block to a wedged position in which said ramp thereon is wedged under said lateral rod to eliminate vertical lash and lash in the direction of said longitudinal centerline of said steering column between said lateral rod and said structural housing, and a latch means operative automatically when said wedge block is pushed back in said guide channel to a retracted position thereof adjacent said inboard end of said guide channel to retain said wedge block in said retracted position thereof with said spring compressed and to release said wedge block from said retracted position thereof in response to engagement of said lateral rod on said ramp on said wedge block when said lip on said retainer plate is hooked over said lateral rod.

2. The energy-absorbing motor vehicle steering column recited in claim 1 wherein said latch means comprises:

an inboard edge on said retainer plate, a lateral shoulder on said wedge block, and a thrust directing means on said structural housing and on said wedge block orienting said spring relative to said wedge block such that the thrust of said spring tips said wedge block upward in said guide channel adjacent said inboard end of said guide channel to seat said lateral shoulder on said wedge block against said inboard edge of said retainer plate until said lateral rod engages said wedge block on said ramp thereof and tips said wedge block downward in said guide channel to unseat said lateral shoulder from said inboard edge of said retainer plate.

3. The energy-absorbing motor vehicle steering column recited in claim 1 wherein said thrust directing means on said structural housing and on said wedge block comprises:

a socket in said wedge block having an end wall oblique to said guide channel in said structural housing, and a spring seat on said structural housing at said inboard end of said guide channel parallel to said oblique end wall of said socket in said wedge block, said spring bearing against each of said spring seat on said structural housing at said inboard end of said guide channel and said oblique end wall of said socket in said wedge block.

* * * * *